INVENTORS
RONALD C. BENSON
NELSON H. MAGEOCH
BY Arthur Middleton
ATTORNEY

INVENTORS
RONALD C. BENSON
NELSON H. MAGEOCH
BY Austin Minadleton
ATTORNEY

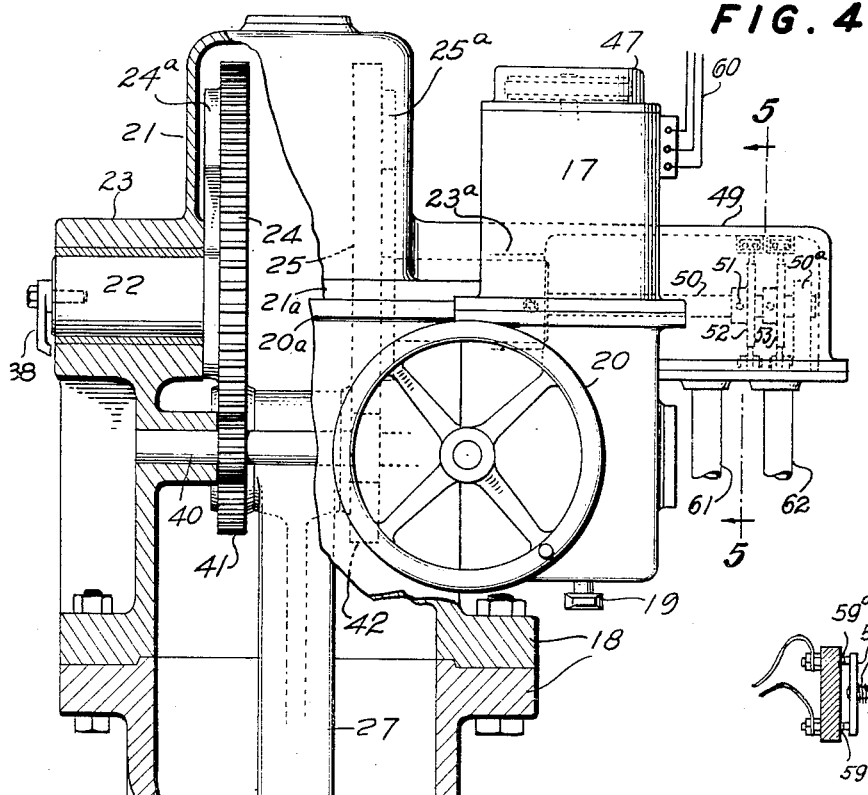
FIG. 4.
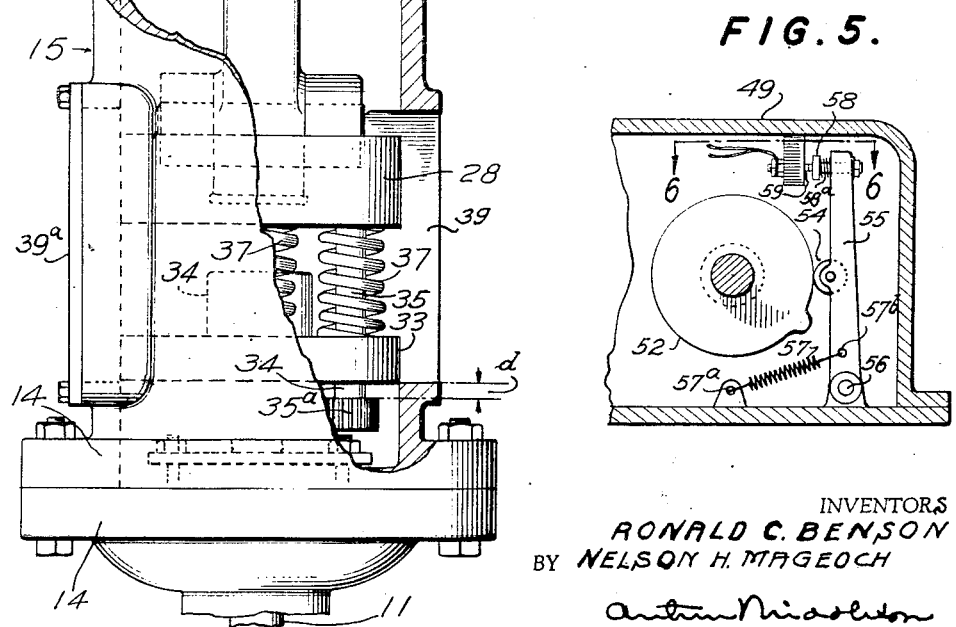
Fig. 6.
FIG. 5.
INVENTORS
RONALD C. BENSON
BY NELSON H. MAGEOCH INVENTORS:
RONALD C. BENSON
NELSON H. MAGEOCH
By Austin Nicholson, Att'y March 30, 1943.   R. C. BENSON ET AL   2,315,389
VALVE CONTROL
Filed April 30, 1941   5 Sheets-Sheet 5

INVENTORS:
RONALD C. BENSON
BY NELSON H. MAGEOCH
By Arthur Middleton, Atty.

Patented Mar. 30, 1943

2,315,389

UNITED STATES PATENT OFFICE 2,315,389

VALVE CONTROL

Ronald C. Benson, Camden, N. J., and Nelson H. Mageoch, Manoa, Pa., assignors to Philadelphia Gear Works, Inc., Philadelphia, Pa., a corporation of Pennsylvania Application April 30, 1941, Serial No. 391,078

7 Claims. (Cl. 74—44)

This invention relates to valves of the type that are provided with motor operated control mechanism for opening and closing the valve as a result of making or breaking the electrical circuit of the motor. Such mechanism functions, therefore, as a valve operator or control. A valve capable of being motor operated, usually has a valve member or disc that is carried by a stem whose reciprocation seats and unseats the disc to close or open the valve. In simpler forms, such valves are provided with wheels which can be manually turned to move the valve stem and its disc to open or to closed position. In the evolution of motor operators for such valves, a motor and suitable gearing were added to the valve. Then it was found that the person controlling the switches to the motor circuit could not always see where the gate was, so another step in the evolution was to include limit switches in the motor circuit. A still further step was to insert torque responsive devices into association with the valve stem so that if the disc met an obstruction or abnormal resistance in closing, the motor circuit would be broken before serious damage is done. However, these additory items grew to be excessive in complication, in accuracy and in cost. Also, such valves, in general, had their stem accurately threaded and at considerable expense, and with which was associated a correspondingly threaded and correspondingly expensive nut. Nut and threaded stem had to be machined carefully and fitted together for accurate movement. The nut was held substantially against bodily reciprocation. So it is among the objects of this invention to devise a valve operator or controller that is simple of design, cheap to manufacture, fool-proof and yet meets all normal requirements.

Furthermore, in the type of valve operators just referred to, the nut when rotated, would cause the valve stem to move longitudinally of itself, that is, to move into opening or closing position. The motor has interposed between it and the nut, gearing that enables the motor to rotate the nut. This arrangement results necessarily in relative slow progressive movement of the valve stem. However, there is a demand for fast moving valves of the motor operated type, that is, valves capable of closing quickly and opening quickly. Not only that but the opening and the closing strokes should take place within a very accurate time interval.

Furthermore, in such valves, the timing or correlating of the time of cessation of the motor operation with its gearing with the complete seating of the valve gate is important. If the motor runs too long, the gate is apt to be jammed into its seat, with a possible bending of the stem. As larger sizes of valves are used, this problem becomes more serious. Even where there is a limit switch for shutting off the motor when the valve gate seats, the motor and its gearing has attained a certain momentum which must be allowed for. Therefore, some valve operators have heretofore been provided with rather elaborate mechanisms for permitting the motor to over-run without jamming the valve gate in its seat. For instance, in the patent to Panish No. 2,203,233 provision is made for automatically disconnecting the motor whenever the valve seating pressure due to over-running of the motor armature should exceed a predetermined maximum.

Valve stems with their discs have a tendency to stick in open or in closed position. This coupled with their normal inertia have tended to put a heavy starting strain on the motors. To overcome this it has been customary to provide means between the motor and the stem whereby a hammer blow is applied to the stem in starting. Therefore, it is another object of this invention to avoid the means for effecting the hammer blow, and to provide an arrangement whereby, while the motor runs or over-runs, the longitudinal speed of the valve stem is automatically diminished or decelerated sharply as it nears the limit or seating end of its stroke.

According to the invention, the motor mechanism, while operating at fairly constant speed, is given greater leverage during the stem starting interval. That is, the stem moves slower with greater leverage applied thereto during its starting interval than during the main part of its reciprocative stroke.

Since rapidity of closing and opening of the valve disc is so important for certain purposes, this invention proposes the devising of a motor operated mechanism by which the valve stem is given a positively controlled deceleration during the valve seating phase. The stem is given a longitudinal movement that is decreasing in slowness to approach rest, while permitting the motor to run at normal speed, or else to over-run after power shut-off, while still being connected to the valve stem by positive means. But, even with all precautions for stopping the motor operator at the right moment with respect to the instant of the valve gate seating, absolute accuracy is difficult of attainment. Therefore, it is proposed by this invention also to provide yielding compensating means between the motor driving mechanism and the valve stem, capable of absorbing excess motion of the driving elements.

In view of the desirability of a rapid and unhampered valve opening movement, the yielding compensating means fulfill a dual purpose by not only absorbing the excessive amount of crank throw, but by also utilizing the energy or tension of compressed spring compensating to help, by rebound as it were, the starting and initial acceleration of the driving element.

In view of the environment presented in the foregoing, some of the objects of this invention are:

1. To design a valve operator which is of simple construction, cheap of manufacture, and yet substantially fool-proof.

2. To provide a positively controlled de-celeration phase for the seating of the valve, and in which the valve seating pressure never exceeds a predetermined maximum.

3. To design a valve operator which is capable of speedily opening and closing the valve, yet free from the operating difficulties, and structural complications heretofore inherent to power actuated valve operators, and in which the rebound energy of compressed compensating means helps overcome starting resistance or starting inertia.

4. To provide a valve operator in which the spring compensating device is accessible.

In view of these objects there are provided in association with a reciprocable valve stem of a motor-operated train of gearing operating a crank the stroke of which in one direction is coincident with one stroke of the valve stem, whereby the valve is moved slowly and with leverage from rest for a brief interval, whereupon the stem is quickly accelerated with lessening leverage to mid-stroke. Then the valve stem is rapidly decelerated with increasing leverage until it reaches a stroke-ending phase. In this phase, the speed of the valve stem is markedly decreased until it barely moves as the point of rest is reached. Resilient compensating means are provided that come into play after the valve disc or gate has reached its seat, so that even if the motor is not stopped at the precise valve seating point, the difference in longitudinal disposition of the valve stem between the absolutely correct rest position and the slightly incorrect position that it would take due to the motor over-running, is taken up by the resilient means, so that the valve gate is correctly seated anyway. The timing of the stoppage of the motor even though it over-runs somewhat with respect to the actual valve seating point in consuming its momentum, is so controlled that when the valve disc is seated, the resilient means are under compression. The degree of compression under these circumstances establishes a valve seating pressure that never exceeds a predetermined maximum.

Hence there are provided simple and powerful means by which, on the one hand, a maximum average operating valve speed is obtainable, while on the other hand a positively controlled reduction in the velocity of valve motion is effected during the valve seating phase thereof.

This involves doing away with the conventional power driven nut and carefully threaded valve stem, and the use instead of a mechanism for producing the desired velocity change kinematically. According to one feature, this is a crank actuated mechanism in which the crank has a throw of sufficient length to meet the requirement for a desired length of valve travel. Consequently, the velocity of the valve motion diminishes from a maximum during the intermediate portion of the travel to zero at the dead centers. That is to say, the crank drive between the motor and the stem makes one stroke to one stroke of the valve stem.

A simple, inexpensive and rugged crank mechanism is powerful enough due to its toggle action, to produce that desired effect in the proper manner, provided suitable cushioning or resilient compensating means are interposed in the train of motion transmitting elements between the crank and the valve proper, to absorb a predetermined amount of excess throw of the crank at the dead centers. This simultaneously imposes seating pressure upon the valve at the dead center valve closing position of the crank, which can never exceed a predetermined maximum.

According to another feature, the valve has a reciprocatable stem controlled by the cross-head of a crank drive, and resilient compensating means associated with the cross-head. In this way the valve stem may in effect be rendered longitudinally resiliently compressible to some extent. That is to say, the effective length of the valve stem, namely, the length between the valve disc or gate and the pivotal center of the cross-head, is correspondingly shortened at the time that the valve is properly seated with the crank in its dead center position. This effective length is free to extend and return to its predetermined maximum, when the seating pressure on the valve is released incident to the opening of the valve.

Some features relate to constructional arrangements of the drive mechanism. For instance, the crank drive herein proposed comprises a power driven gear having a laterally extending crank pin from which a connecting rod extends to a cross-head connected with the valve stem.

Other features relates to the disposition of the resilient means, and to devices to adjust their functioning.

Other features relate to means for indicating and controlling the dead center locations of the actuating crank.

Among the advantages obtained in a construction according to this invention, are: relatively faster operation without the drawbacks attendant to the operation of the valve type actuated by a nut and threaded stem, accurate adjustability of the valve seating pressure, greater reliability due to ruggedness and structural simplicity, cheapness of construction and greater longevity of the parts, flexibility of design, and still other advantages which will appear from the more detailed description of the present construction. Another advantage is that the crank can be either reciprocated by the use of a reversing motor, or continuously rotated without reversing.

The invention possesses other objects and features of advantage, some of which, with the foregoing, will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

While the invention relies upon the use of crank actuated means in conjunction with certain yielding compensating means which latter came into play when the valve closes, it is not intended to be limited to the specific embodiment shown. That is to say, it is not limited to a construction using an axially moving valve stem, but may comprise, for instance, a valve member carried by a swingable actuating member or double-armed lever one end of which carries the valve member, and the other or free end of which is connected with the crank pin by a connecting rod or link.

The novel features considered characteristic of our invention are set forth with particularity in the appended claims. The invention itself, however, both as to its organization and its method of operation, together with additional objects and advantages thereof, will best be understood from the following description of a specific embodiment when read in connection with the accompanying drawings in which:

Fig. 4 is a part-sectional view taken upon Fig. 2 in the direction of arrow 4;

Fig. 5 is a section along the line 5—5 in Fig. 4 through the switch box, showing cam-controlled limit switches, driven by the crank shaft;

Fig. 6 is a top view of the switch contacts taken on line 6—6 in Fig. 5;

Figure 1:
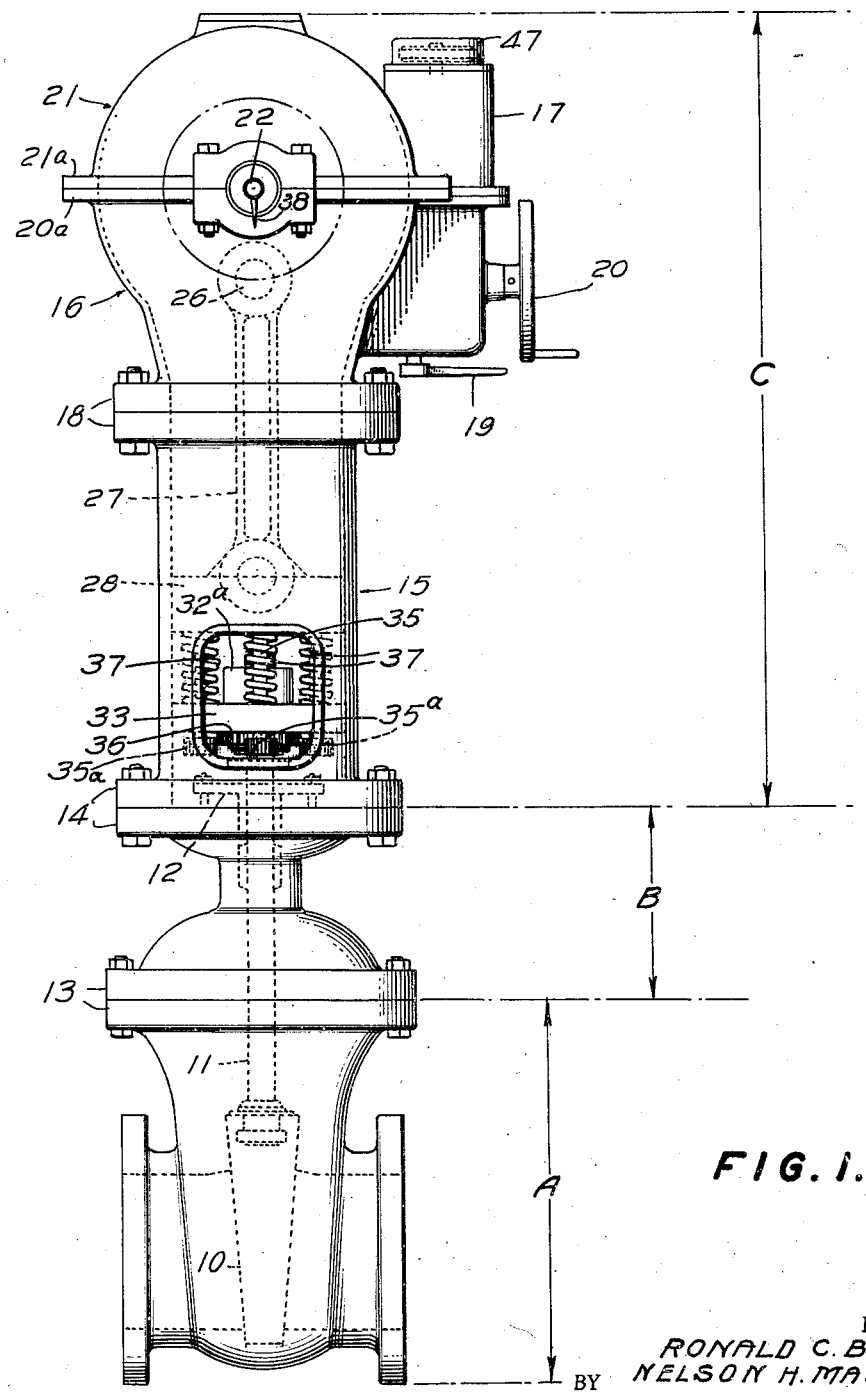
Fig. 1 is a total side view of the valve and valve operator.

For the purpose of this description, the construction shown in Fig. 1 may be sub-divided into three sections, the valve body A, the bonnet B, and the valve operator C. The valve body has in it a valve member or valve disc or gate 10 carried by a valve stem 11 which extends through the valve bonnet B and through a stuffing box 12 therein. The bonnet B has a flange and bolt connection 13 with the valve body A, and another flange and bolt connection 14 with the valve operator C. The valve operator C has a lower housing section 15 represented by a cylindrical body serving as a guide track for the cross-head hereinafter to be described, and an upper housing section 16 enclosing the crank drive proper as will be described, both sections having a flange and bolt connection 18 with one another. A motor for the crank drive is indicated at 17. A hand lever 19 is shown for disconnecting the motor from the crank drive, and a hand wheel 20 for operating the valve by hand.

Figure 2:
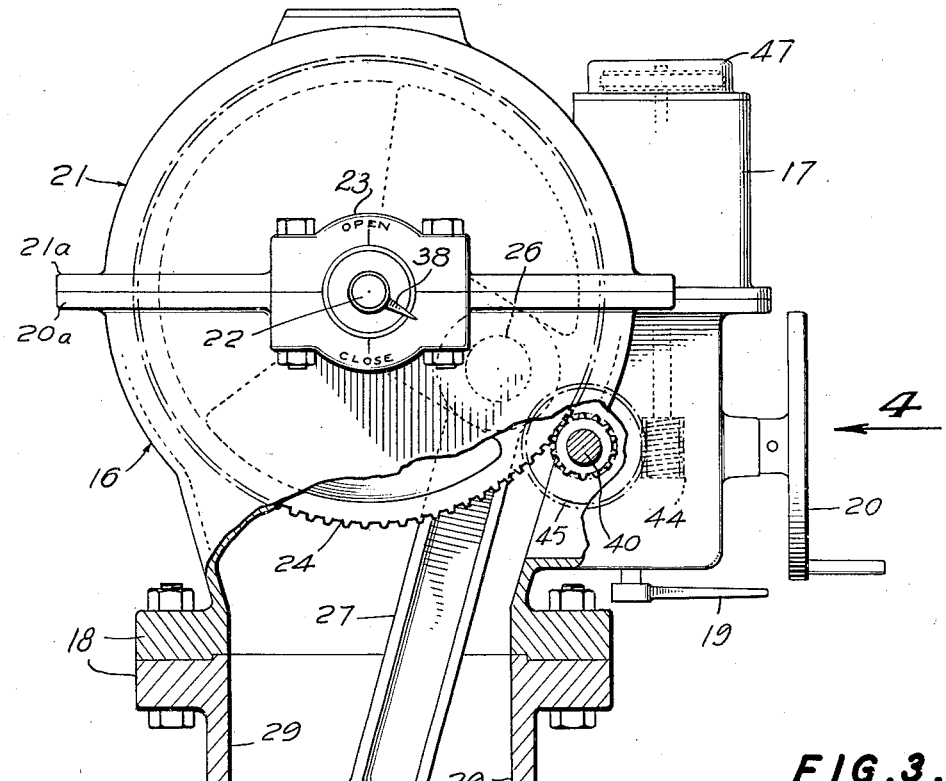
Fig. 2 is an enlarged part-sectional side view of the valve operator.

Referring to Figs. 2 and 4, it will be seen that the upper housing section in turn has a lower half or portion 16 and an upper half or portion 21 bolted together by way of their flanges 20$^a$ and 21$^a$. Together they form a pair of journal bearings for a crank shaft 22 which is part of the crank drive presently to be described. One such journal bearing 23 is exposed and visible in Fig. 2, a corresponding opposite journal bearing 23$^a$ being disposed within the housing section 16 and indicated in dotted lines.

Figure 3:
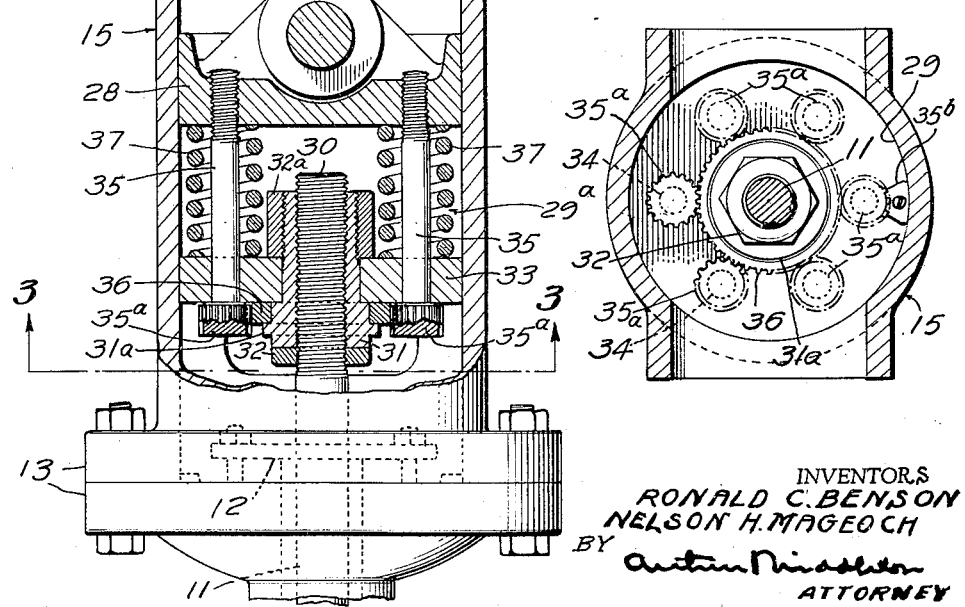
Fig. 3 is a cross-section along the line 3—3 taken upon Fig. 2.

A crank drive for reciprocating the valve stem 11 may assume various suitable forms, but is herein shown to comprise the crank shaft 22 having a pair of crank arms in the form of gears 24 and 25 interconnected by a crank pin 26. The gears or crank arms are shown to have counterweights 24$^a$ and 25$^a$ respectively. Crank motion is transmitted to the valve stem 11 by means of a connecting rod 27 which is pivotally connected with a cross-head 28 which slides on inner guide faces 29 of the lower housing section 15. The cross-head 28 has an adjustable pressure yielding lost motion connection with the valve 11, collectively designated by the numeral 29$^a$. This lost motion connection is described as follows:

The threaded end 30 of the valve stem 11 is engaged by a nut member 31 which may be secured in adjusted position upon the valve stem by a lock nut 32. Fitted over the nut member 31 is an annular member or terminal member or intermediate member 33 secured on the nut member 31 by a lock nut 32$^a$ engaging in exterior thread of the nut member 31. The annular member or head member or intermediate head 33 has circularly arranged a number of holes, for instance, six, according to Fig. 3 through which extend loosely the shafts of anchoring bolts 35 provided with heads in the form of pinions 35$^a$, the ends of which bolts are screwed into the cross-head 28. A gear 36 is loosely seated on and surrounding the nut member 31 and confined thereon against axial displacement between a shoulder 31$^a$ on the nut member 31 and the annular member 33, the gear 36 meshing with the pinions 35$^a$. A coil spring 37 surrounds each anchoring bolt 35, and is confined between the cross-head 28 and the annular member 33.

It will be seen that the nut member 31 can be adjusted on the valve stem 11, so as to cause a predetermined amount of compression of the springs 37 when the crank is in its dead center valve closing position. This amount of spring compression may be adjusted by first adjusting the nut member 31 so that the crank can be placed in its dead center valve closing position, such as may be indicated by a pointer 38 attached to the end of the crank shaft, substantially without encountering any valve seating resistance, and then screwing the nut member 31 up on the valve stem 11 until a desired degree of compression of the springs is reached. In doing so the bolts 35 will slide in the annular member 33 and correspondingly the bolt heads or pinions 35$^a$ will move axially in the teeth of the gear 36, and such axial movement or spring compression must therefore not exceed the distance at which the pinions 35$^a$ might become disengaged from the gear 36. The purpose of the gear 36 and the pinions 35$^a$ is that by rotating one of the pinions, all the other pinions will be rotated simultaneously, thereby screwing the bolts 35 more or less, whichever the case may be, but simultaneously into the cross-head 28. The rotation of a pinion 35$^a$ for the purpose of such adjustment may be effected with the aid of a suitable special key or wrench the head of which is formed with internal teeth to be slipped over and to fit the teeth of the pinion 35$^a$. As will be seen, such operation of the pinions and gear is a convenient means for fine adjusting the compression of the springs 37 when the valve stem is in dead center valve closing position. A special key may be provided that fits over one of the pinions 35ª and whereby the pinion may be rotated, and it will be seen that the width of the pinion teeth is greater than the width of the teeth of the gear 36. On the other hand a toothed member 35ᵇ may be used to engage one of the pinions 35ª, and detachably fastened to the annular member 28, for locking one pinion and thereby all other pinions 35ª and the gear 36. Hand holes 39 are provided in the lower housing section 15, through which the cross-head 28 and its lost motion connection with the valve stem 11 are accessible for inspection and adjustment. These hand holes may be closed by suitable covers indicated at 39ª. While there is herein disclosed an embodiment in which the cross-head 28 and associated parts are guided on the internal guiding faces 29 of the lower housing section 15, it should nevertheless be understood that such construction could be modified, for instance, by substituting for the lower housing 15 a number of guide rods or posts rigidly interconnecting the bonnet B with the housing portion 16, and, as it were, forming a cage the rod members of which may then serve as guide members or guide rails for the cross-head 28 and the annular member 33.

The crank shaft 22 is driven by counter-shaft 40 having fixed thereon a pair of pinions 41 and 42 corresponding to and meshing with the gears 24 and 25. The countershaft 40 is journaled in the housing portion 16 and driven from a motor 17 mounted thereon, the drive connection between the motor and the counter-shaft 40 being indicated as by a worm 44 engaging a worm gear 45 fixed on the counter-shaft 40. A solenoid-controlled brake device for the motor 17 is diagrammatically shown and identified by the numeral 47. This brake device is to help provide instantaneous stoppage of the motor 17 at a point corresponding to the dead center valve closing position of the connecting rod 27. Therefore other equivalent brake devices could be used that accomplish the same purpose.

On the upper housing section 21 of the valve operator C is shown a switch box 49 containing control switches for automatically cutting off the motor power at the end of the opening and closing movements of the valve stem 11. As indicated in Fig. 4, these switches are positively controlled limit switches, and they may be in the form of geared switches, that is to say, switches that are geared to the valve drive, although in the present instance there is shown a switch shaft 50 fixed to and extending co-axially with the crank shaft 22 at the inner end thereof, the outer end of the shaft 50 being guided and supported in a bearing 50ª inside the switch box. Adjustably fixed on the switch shaft 50 as by set screws 51 are a pair of switch actuating cam members 52 and 53 (although more than two cam members may be provided), to actuate respective switch contacts corresponding to the upper and lower limit positions of the valve stem. Additional cam members can be provided and set to operate switches at any intermediate position of the valve gate, or to operate interlocking means or signal lights. Each switch actuating cam engages a corresponding cam roller such as the cam roller 54 (see Fig. 5) mounted on a switch arm 55 swingably mounted in the switch box as at 56, the cam roller 54 being held in contact with its associated cam by a spring 57 shown to be attached as at 57ª to the bottom of the switch box and at 57ᵇ to the switch arm 55. The free end of the switch arm 55 carries a yieldably mounted contact member 58 engaging stationary contact 59. Each such switch arm and its contacts may be arranged and function in the way of a double break single pole switch, as appears from Fig. 6, and is normally open or normally closed. In Fig. 6, the yieldable contact member 58 is shown to bridge the gap between contact points 59ª and 59ᵇ, the contact member 58 being yieldable by reason of a spring mounting 58ª. Motor leads are shown at 60. The switch box is shown to have a conduit 61 for leads to a controlling switch, and another conduit 62 for leads to a push button or timer or to some interlocking equipment.

It will be seen that, when the valve is closed and the connecting rod 27 in its corresponding dead center position, as in Fig. 1 and Fig. 4, a certain amount of preadjusted excess throw of the crank will be absorbed by the compression of the springs 37, causing the bolts 35 to slide in the annular member 33, and the bolt heads or pinions 35ª to move away from the annular member 33 a distance d. When the switch is timed (as by adjustment of a cam member, such as 52) to cut the motor power at the valve closing dead center position of the crank shaft 22, a substantially instantaneous stoppage of the power drive in that position is realizable with a proper degree of compression of the springs 37, aided by the simultaneous function of the solenoid-controlled brake device 47 for stopping the motor armature. The springs 37 incidentally also absorb whatever thermal expansion may occur in the valve stem 11.

It should further be noted that the springs 37 in combination with the crank drive according to this invention, serve still another important purpose, namely, incident to the initial opening phase in the operation of the valve. In that phase the springs 37 are decompressed, and their potential energy is released. The energy of the springs reacts into the drive mechanism and accelerates the elements thereof, such as the connecting rod 27, the crank and gears 24 and 25, and other motion transmitting elements between these gears and the motor, and thus aids in speedily opening the valve.

The valve gate 10 and the valve stem 11 under these circumstances cannot be accelerated immediately, since the reaction of the compressed springs 37 tends to hold the gate in closed position. Spring energy is transferred to the immediate movable parts of the drive elements, whereas the gate and the valve stem are accelerated only after the springs 37 are decompressed.

*Operation*

The crank actuated valve as herein described may be operated by turning the crank in one direction only, that is, either clockwise or counter-clockwise, whereby the first half of one crank revolution will move the valve gate, for instance, from its open position to its closed position, and the following half of that crank revolution will accordingly move the valve gate from its closed position back to its open position. Suitable electrical control means will stop the crank in its closing or opening dead center position respectively.

Another way of operating the crank actuating valve is by means of a somewhat different electrical control and with the aid of a reversible motor. In that instance the valve gate may be closed by one-half crank revolution from dead center to dead center in a clockwise direction, and may be opened by a corresponding half crank revolution in counter-clockwise direction.

The operation of the valve when the crank is to be rotated in one direction only, will now be described in connection with the wiring diagram in Fig. 7.

Figure 9:
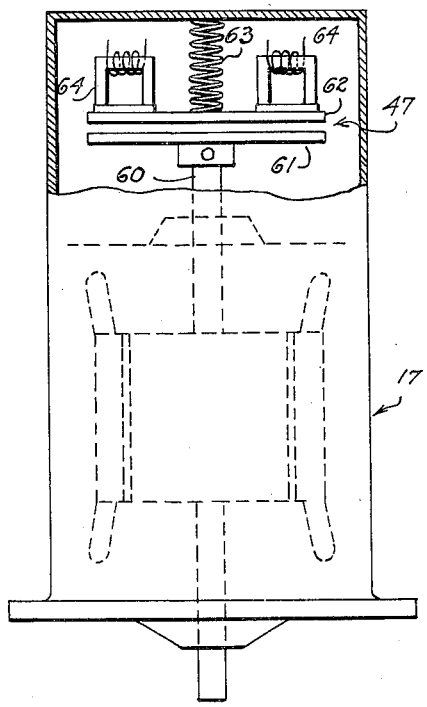
Fig. 9 is a diagrammatic showing of the motor with brake device.

The valve motor 17 and its solenoid-controlled brake device 47 have electrical power supply lines indicated by the three phases $L_1$, $L_2$, $L_3$ provided with a magnetic power switch having control contacts CR for the respective phases. The brake device is more clearly, although diagrammatically shown, in Fig. 9, and it is connected with the power supply lines in such a manner that it tends to stop the motor armature when the power is cut off and the brake solenoids are de-energized, but releases the armature when the power circuit is closed and the brake solenoids are energized. In Fig. 9 the motor armature shaft is indicated at 60 carrying a brake member or disk 61. A corresponding stationary brake member is shown at 62, provided with a spring 63 tending to press it against the brake member 61. Three phase circuits usually employ one magnet-coil per phase and such magnet-coils are indicated as at 64. When the magnet-coils are energized they will attract the brake member 62 overcoming the pressure of the spring 63, and thereby release the motor armature 60 for rotation. When the magnet-coils are de-energized, the spring 63 is free to press the stationary brake member 62 against the rotary brake member 61 for stopping the armature 60.

Figure 7:
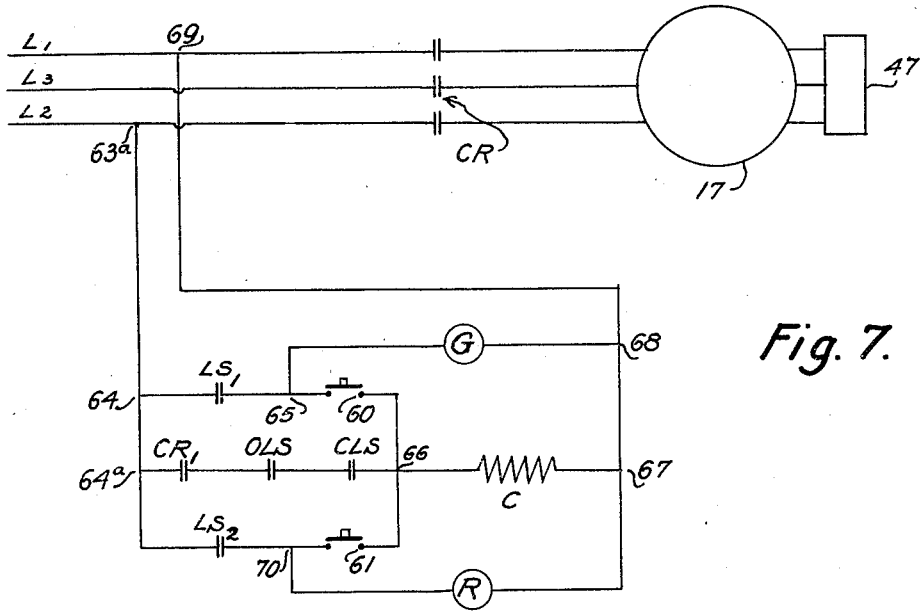
Fig. 7 is a wiring diagram to illustrate the operation of the crank actuated valve, with the crank being rotated in one direction only, each consecutive half revolution of the crank shaft representing one valve stroke in the opening or closing direction respectively.

Referring to Fig. 7, it will be understood that there is provided a magnetic power switch which comprises the controller contacts CR proper, and also controller holding contacts $CR_1$ coupled with the controller contacts CR, and furthermore a holding or controller coil C for both. For starting the motor, to open or to close the valve, there are provided an "open" push button 60 and a "close" push button 61 respectively.

For stopping the motor there are provided an opening limit switch OLS and a closing limit switch CLS, which limit switches correspond to the switch controlling cam members 52 and 53 respectively in Fig. 4 timed with the valve actuating mechanism.

There are also provided signal light switches which may be actuated by cam members similar to the cam members 52 and 53 from the valve actuating mechanism, and associated in suitable phase relation to the cam members 52 and 53 upon the switch shaft 50 (see Fig. 4). Such signal switches incidentally are not shown in the switch box in Fig. 4. A red signal light, for instance, to appear during the opening movement of the valve and while the valve is open, is designated by the letter R, a green signal light to appear during the closing movement of the valve and while the valve is closed, is designated by the letter G.

Assuming the valve is closed with the drive crank in its lower dead center position, in order to open the valve, the open push button 60 is depressed momentarily, establishing a circuit from point $63^a$ on power phase $L_2$, over point 64 through a then closed light switch $LS_1$, to point 65, over the push button contact 60, to point 66, and through the controller coil C, over point 67, point 68, to point 69 on power phase $L_1$. This momentary current through coil C causes the controller contacts CR and the controller holding contacts $CR_1$ to close, thereby keeping the coil C energized, and completing a power circuit to the motor 7 and the brake device 47. Hence, the brake magnet-coils are energized and the brake released, and the motor through the driving elements such as the pinions 41 and 42 and the gears $24^a$ and $25^a$, drives the crank, say, in a clockwise direction towards the open valve or upper dead center position.

After the motor has been started and the push button 60 been released, the current through coil C is maintained through contacts $CR_1$ and closed limit switches OLS and CLS. The light switch $LS_1$ then also being closed, maintains the green light G for the duration of the valve opening movement. At the point when the valve reaches its open end position incident to the upper dead center position of the crank, the opening limit switch OLS and the light switch $LS_1$ will open due to their timing with the valve actuating mechanism by way of corresponding adjustable switch actuating cam members on the switch shaft 50 (see Fig. 4), and interrupt the current through the coil C, as well as the current through the signal lamp G. The coil C thus being de-energized, will cause the controller holding contacts $CR_1$ and the controller contacts CR, to open, and thereby stop the motor and apply the motor brake of the brake device 47.

For the purpose of closing the valve, the "Close" push botton 61 is depressed, establishing the motor starting circuit from point $63^a$ on power phase $L_2$, over points 64 and $64^a$, through the then closed light signal switch $LS_2$, point 70, over the push button contact 61, through operating coil C, over point 67, point 68, to terminal point 69 on power phase $L_1$. This momentary circuit causes the controller contacts CR and the controller holding contacts $CR_1$ to close, thus keeping the coil C energized, starting the motor 17 while releasing the motor brake of the brake device 47, and driving the valve gate towards its closed position. At the point where the valve thus reaches its closed position incident to the lower dead center position of the valve actuating crank, the closing limit switch CLS and the light signal switch $LS_2$ open, due to their timing with the valve actuating mechanism, interrupting the current through the coil C and the current through the signal lamp R. Due to the coil C thus being de-energized, the controller holding contacts $CR_1$ and the controller contacts CR will open, and stop the motor and apply the motor brake of the brake device 47.

It will be noted that the signal light switches $LS_1$ and $LS_2$ are closed at all times except at respective extreme ends of the travel of the valve gate, so that a signal indication may be had as to the position of the valve gate, that is an indication as to whether the gate is open or closed or in some intermediate position. That is to say, both the red and the green light appear while the valve gate is moving in the one or the other direction, but the red light alone remains when the valve gate has reached its open end position while only the green light remains when the valve gate has reached its closed end position.

Figure 8:
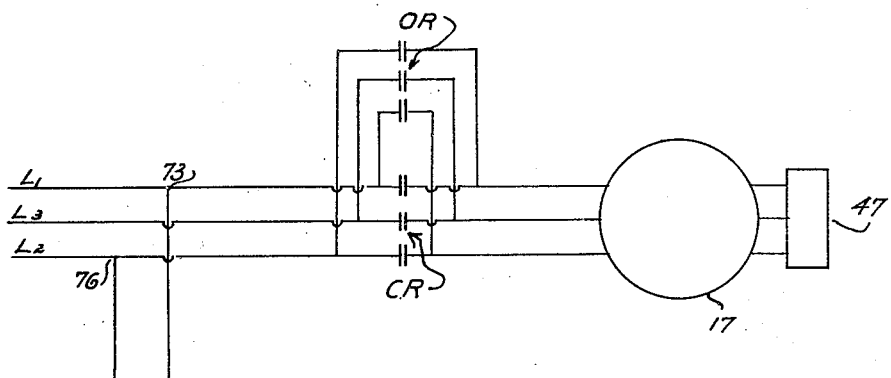
Fig. 8 is a wiring diagram including a reversible motor, to illustrate the operation of the crank actuated valve, with the crank being rotated in one direction for the valve opening stroke, and in the reverse direction for the valve closing stroke.

The operation of the crank actuated valve by means of a reversing motor is illustrated by way of the wiring diagram in Fig. 8. In that instance, in order to open the valve, the control of the motor to produce clockwise rotation of the valve actuating crank, is effected by controller contacts OR, controller holding contacts $OR_1$, and the operating or holding coil OC. In order to close the valve, counter-clockwise rotation is established by the reversing controller contacts CR, controller holding contacts CR₁, and the corresponding operating or holding coil CC. Limit switches OLS for terminating the valve opening movement and CLS for terminating the valve closing movement, are operatively connected with, and timed with the operation of the valve actuating mechanism, so that limit switch OLS opens when the valve is open, and limit switch CLS opens when the valve is closed. The controller contacts OR and CR, and their respective holding contacts OR₁ and CR₁, the operating coils OC and CC, and the push buttons 71 and 72, all may be said to constitute a reversing magnetic power switch. Again, the letters R and G represent a red and a green signal light respectively, which in this instance are controlled by the limit switches OLS and CLS respectively. The "Open" push button 71 initiates the opening of the valve, and the "Close" push button 72 the closing of the valve.

In operation, assuming the valve is to be closed, the open push button is depressed momentarily, establishing a circuit from the terminal point 73 on the power phase L₁ over points 74 and 75, over the push button contacts 71 through the operating coil OC and the then closed limit switch OLS, over point 75 to the terminal point 76 on the power phase L₂. This momentary circuit energizes operating coil OC and causes the controller contacts OR and its holding contacts OR₁ to close, and to start the motor 17, while releasing the brake of the brake device 47 in the manner already described in connection with Fig. 7. Due to the coil OC remaining energized, the motor continues to run in a, say, clockwise direction, until the valve has reached its open end position incident to the open dead center position of the valve actuating crank, at which point the limit switch OLS opens, thus interrupting the current through operating coil OC, causing the motor 17 to stop while the brake of brake device 47 is applied, and the signal light G extinguished.

It will be noted that in the valve closing dead-center position of the mechanism, the compensating springs 37 absorb the differential between the throw of the crank and the shorter throw of the gate member 10. It is further to be noted that the drive mechanism should come to rest in valve closing position, that is when the crank drive is at or near dead-center. While it is not necessarily practicable to effect stoppage at exactly the same point with respect to the dead-center, or at the dead-center, the stoppage should occur at or near enough to the dead-center to insure sufficient valve seating pressure due to some degree of compression of the compensating springs 37. In other words, the stoppage point, although within certain limits, should be timed in such a manner that it will come within the valve seating phase, during which the gate member 10 is in actual contact with its seat.

Therefore, the maximum distance D between the cross-head 28 and the intermediate member 33 should be adjusted by adjusting the bolts 35 so that the stoppage of the drive crank will occur within the compression or the decompression period of the springs 37 during the valve seating phase, that is either at or somewhat before, or somewhat after the dead-center, although within the limits defined by the valve seating phase.

It will then be seen that the bolts 35 represent means which define the maximum spacing D between the cross-head 28 and the intermediate member 33, which means embody a lost motion connection between the bolts 35 and the intermediate member 33, which permits of lessening the maximum distance D incident to compression of the springs during the valve seating phase. In a practical adjusted condition the springs 37 are normally compressed to a degree incident to the maximum distance D whereby the thus created spring tension is sufficient to maintain the distance D during the operating cycle of the crank, except during the valve seating phase during which the springs 37 are further compressed to a degree corresponding to the differential of the throw of the crank and the throw of the valve stem 30.

The fine adjustment of the desired distance D in relation to the spring compression to be effected during the valve seating phase, can be conveniently realized by means of the declutchable means whereby the drive can be manually actuated as by means of the handwheel 20. By manipulating this handwheel the crank drive can be placed accurately in valve closing dead-center position whereby the bolts or spacing means 35 are relieved of the tension normally imposed upon them by the springs 37, so that the bolts can be turned simultaneously by the master gear 36 meshing with the pinions 35a. In this way, the distance D can be lengthened or shortened, depending on whether the bolts 35 are screwed into or out of the cross-head 28. By such adjustment the stopping point of the mechanism can be brought to within the limits defined by the valve seating phase.

During the operating cycle, that is during one complete revolution of the drive crank, the maximum distance D between the cross-head 28 and the intermediate member 33 is substantially maintained, except during that phase of the cycle that occurs after the gate reaches its seat, when the springs 37 are compressed and thereafter decompressed until the gate leaves its seat. This phase of gate contact with its seat incident to the compression and the decompression of the springs, may be referred to as the gate or valve seating phase or, briefly, as the seating phase.

In order to rotate the crank actuating valve in counter-clockwise direction, so that the valve may be closed, the push button 72 is depressed, causing a corresponding action of operating coil CC, of the reversing controller contacts CR and of its holding contacts CR₁. The motor is thus started and the opening movement of the valve will be terminated by the limit switch CLS which opens due to its timing with the valve actuating mechanism, when the valve actuating crank has reached its lower dead center position. This will also extinguish the signal light R. It will be noted that, due to the timing with the valve actuating mechanism, both signal lights G and R will appear at all times that the valve gate is in motion or disposed intermediate its end positions, but that one of the signal lights is extinguished at a corresponding end position of the valve gate.

The primary control means for the motor are not intended to be limited to push buttons as shown in the present wiring diagrams of Fig. 7 and Fig. 8 but may include other control means such as timers, pressure—or other switching devices.

We claim:

1. Apparatus for operating a reciprocable element to and from positive contact with a fixed complementary element, comprising a reciprocable element, a stem associated therewith and adapted to be moved in axially reciprocating fashion, a fixed complementary element, a frame secured to the fixed element provided with bearings fixedly spaced from the fixed element, a motor-driven crank-shaft operable in the bearings, a crank on the crank-shaft, a cross-head actuated from the crank, guide means for said crosshead, an intermediate head carried by the stem, spacing means between the cross-head and the intermediate head member for limiting their maximum spacing apart, resiliently compressible means between the cross-head and the intermediate member for resiliently resisting a lesser spacing apart, the throw of the cross-head on the crank being greater than the throw of the intermediate head member on the stem whereby the compressible means are compressed as said maximum spacing is being lessened due to the differential of said throws, and adjusting means for varying the differential of said throws and thereby the degree of compression of the compressible means, to enable said cross-head to come to rest while the compressible means are exerting contacting pressure on the reciprocable element during fixed element contacting phase.

2. Apparatus according to claim 1, with the addition of means associated with said spacing means for adjusting said maximum spacing, declutchable hand-operated means for rotating said crank comprising a hand-operated member, and ratio increasing power transmitting means between said hand-operated member and said crank, said hand-operated means being operable to close the reciprocable element member by hand and to position the crank substantially in a dead-center fixed-element-contacting position whereby there is effected substantially maximum compression of the compressible means while said spacing means are relieved of tension normally imposed upon them by said compressible means, and whereby said spacing means are adjustable while thus relieved.

3. Apparatus for operating a reciprocable element to and from positive contact with a fixed complementary element of a housing body, comprising a reciprocable element, a stem associated therewith having a threaded free-end portion, a frame secured to the body provided with bearings fixedly spaced from the fixed element, a motor-driven crank-shaft operable in the bearings, a crank on the crank-shaft, a cross-head actuated from the crank, guide means for said cross-head provided on said frame, an intermediate member carried by the stem, a nut member on said threaded end portion of the stem, said intermediate member surrounding said nut member, said nut member being rotatable in said intermediate member but substantially non-shiftable axially with respect thereto, a plurality of bolts fixedly extending parallel to said stem with one end screwed into said cross-head while the other end extends through and is slidable in said intermediate member, a pinion fixed to the free end of each bolt, a gear rotatable upon said nut member but substantially non-shiftable axially with respect thereto while disposed to mesh with said pinions and having teeth the width of which is larger than the width of the pinion teeth, and compression spring means interposed between said cross-head and said terminal member whereby the compression of said spring means causes said pinions to move axially relative to said gear while maintaining meshing relationship therewith.

4. Apparatus according to claim 1, in which said adjusting means comprise means for varying the effective length of said spacing means.

5. Apparatus according to claim 1, in which said spacing means comprise spacing bolts having one end screwed into one of said heads and having the other end adapted to slide loosely in the other of said heads, and in which the differential of said throws can be varied by varying the degree to which the bolts are screwed into said first mentioned head.

6. Apparatus according to claim 1, in which the adjusting means comprise means for varying the effective length of said stem.

7. Apparatus according to claim 1, in which the adjusting means comprise a nut member on the threaded end portion of the stem, which nut member is rotatable in said intermediate head but substantially non-shiftable axially with respect thereto, and means for locking said nut member in adjusted position on the threaded end portion of said stem.

RONALD C. BENSON.
NELSON H. MAGEOCH.